(12) United States Patent
Klipper et al.

(10) Patent No.: US 6,699,913 B1
(45) Date of Patent: Mar. 2, 2004

(54) PROCESS FOR PREPARING MONODISPERSE ANION EXCHANGERS HAVING STRONGLY BASIC FUNCTIONAL GROUPS

(75) Inventors: Reinhold Klipper, Köln (DE); Ulrich Schnegg, Leverkusen (DE); Rüdiger Seidel, Leverkusen (DE); Hans-Karl Soest, Köln (DE); Alfred Mitschker, Odenthal (DE); Holger Lütjens, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 78 days.

(21) Appl. No.: 09/642,799

(22) Filed: Aug. 21, 2000

(30) Foreign Application Priority Data

Aug. 27, 1999 (DE) .......................................... 199 40 868
Nov. 10, 1999 (DE) .......................................... 199 54 015

(51) Int. Cl.$^7$ .................................................. C08F 8/34
(52) U.S. Cl. .............................. 521/30; 521/32; 521/39
(58) Field of Search ............................... 521/30, 32, 39

(56) References Cited

U.S. PATENT DOCUMENTS

| | | | |
|---|---|---|---|
| 3,586,646 A | 6/1971 | Corte et al. | 260/2.2 R |
| 3,716,482 A | 2/1973 | Corte et al. | 210/37 |
| 3,989,650 A | 11/1976 | Lange et al. | 260/2.1 E |
| 4,232,125 A | 11/1980 | Buske | 521/32 |
| 4,382,124 A | 5/1983 | Meitzner et al. | 521/38 |
| 4,419,245 A | 12/1983 | Barrett et al. | 210/681 |
| 4,427,794 A | 1/1984 | Lange et al. | 521/28 |
| 4,444,961 A | 4/1984 | Timm | 526/88 |
| 4,952,608 A * | 8/1990 | Klipper | 521/32 |
| 4,988,738 A | 1/1991 | Mitschker et al. | 521/30 |
| 5,231,115 A | 7/1993 | Harris | 521/28 |
| 5,464,875 A * | 11/1995 | Klipper | 521/32 |

* cited by examiner

Primary Examiner—Bernard Lipman
(74) Attorney, Agent, or Firm—Godfried R. Akorli; Diderico van Eyl

(57) ABSTRACT

The present invention relates to a process for preparing novel, monodisperse anion exchangers having strongly basic functional groups either in the center of the resin particle or in the shell of the resin particle, as well as to their use.

17 Claims, No Drawings

PROCESS FOR PREPARING MONODISPERSE ANION EXCHANGERS HAVING STRONGLY BASIC FUNCTIONAL GROUPS

BACKGROUND OF THE INVENTION

The present invention relates to a process for preparing novel monodisperse anion exchangers whose strongly basic functional groups are either in the center of the resin particle or in the shell of the resin particle, as well as to their use.

U.S. Pat. No. 4,444,961 discloses, inter alia, a process for preparing monodisperse anion exchangers. Here, haloalkylated polymers are reacted with an alkylamine.

EP-A 46,535 describes, with reference to U.S. Pat. No. 3,989,650, the preparation of monodisperse, macroporous strongly basic anion exchangers of uniform particle size by a direct spraying and micro-encapsulation process.

EP-A 351,621 discloses the preparation of bifunctional hetero-disperse anion exchangers whose strongly basic functional groups are distributed in the center of the resin particle and in the shell of the resin particle.

Starting from this prior art, the object of the present invention was to provide a method for preparing monodisperse anion exchangers, preferably monodisperse macroporous anion exchangers with a high mechanical and osmotic stability of the beads, with an improved absorption capacity for anions, and at the same time with the strongly basic functional groups distributed either in the center of the resin particle or in the shell of the resin particle.

SUMMARY OF THE INVENTION

The present invention provides a process for preparing monodisperse anion exchangers having strongly basic functional groups distributed either in the center of the resin particle or in the shell of the resin particle comprising (a) reacting monomer droplets made from at least one monovinylaromatic compound and at least one polyvinylaromatic compound, and, if desired, a porogen and/or, if desired, an initiator or an initiator combination to give a monodisperse, crosslinked bead polymer, (b) amidomethylating the monodisperse, crosslinked bead polymer from step (a) with phthalimide derivatives, (c) converting the amidomethylated bead polymer from step (b) to an aminomethylated bead polymer, (d) Leuckart-Wallach-alkylating the aminomethylated bead polymer from step (c) to give a weakly basic anion exchanger having tertiary amino groups, (e) partially loading the weakly basic anion exchanger from step (d) using a strong acid, and (f) quaternizing the partially loaded weakly basic anion exchanger from step (e).

DETAILED DESCRIPTION OF THE INVENTION

Surprisingly, the monodisperse anion exchangers prepared according to the present invention have a higher utilizable capacity when in use, lower pressure loss, and higher osmotic and mechanical stability than the resins known from the above-mentioned prior art, in particular from EP-A 351,621.

The monodisperse, crosslinked vinylaromatic base polymer according to process step (a) may be prepared by the processes known from the literature. Processes of this type are described, for example, in U.S. Pat. No. 4,444,961, EP-A 46,535, U.S. Pat. No. 4,419,245, or WO 93/12167, the contents of which are incorporated into the present application by way of reference in relation to process step (a).

In process step (a), at least one monovinylaromatic compound and at least one polyvinylaromatic compound are used. However, it is also possible to use mixtures of two or more monovinylaromatic compounds and mixtures of two or more polyvinylaromatic compounds.

Preferred monovinylaromatic compounds for the purposes of the present invention in process step (a) are monoethylenically unsaturated compounds, such as styrene, vinyltoluene, ethylstyrene, α-methylstyrene, chlorostyrene, chloromethylstyrene, alkyl acrylates, and alkyl methacrylates. Particular preference is given to the use of styrene or mixtures of styrene with the above-mentioned monomers.

Preferred polyvinylaromatic compounds for the purposes of the present invention for process step (a) are multifunctional ethylenically unsaturated compounds, such as divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate, or allyl methacrylate.

The amounts used of the polyvinylaromatic compounds are generally from 1 to 20% by weight (preferably from 2 to 12% by weight, particularly preferably from 4 to 10% by weight), based on the monomer or its mixture with other monomers. The nature of the polyvinylaromatic compounds (crosslinking agents) is selected with the subsequent use of the spherical polymer in mind. In many cases divinylbenzene is suitable. For most uses, commercial qualities of divinylbenzene are sufficient, and comprise ethylvinylbenzene besides the divinylbenzene isomers.

In one preferred embodiment of the present invention, micro-encapsulated monomer droplets are used in process step (a).

Possible materials for the microencapsulation of the monomer droplets are those known for use as complex coacervates, in particular polyesters, natural or synthetic polyamides, polyurethanes, and polyureas.

An example of a particularly suitable natural polyamide is gelatin, which is used in particular as coacervate and complex coacervate. For the purposes of the present invention, gelatin-containing complex coacervates are primarily combinations of gelatin with synthetic polyelectrolytes. Suitable synthetic polyelectrolytes are copolymers incorporating units of, for example, maleic acid, acrylic acid, methacrylic acid, acrylamide, or methacrylamide. Particular preference is given to the use of acrylic acid and acrylamide. Gelatin-containing capsules may be hardened using conventional hardeners, such as formaldehyde or glutaric dialdehyde. The encapsulation of monomer droplets with gelatin, with gelatin-containing coacervates and with gelatin-containing complex coacervates is described in detail in EP-A 46,535. The methods for encapsulation using synthetic polymers are known. An example of a highly suitable process is interfacial condensation, in which a reactive component dissolved in the monomer droplet (for example, an isocyanate or an acid chloride) is reacted with a second reactive component dissolved in the aqueous phase (for example, an amine).

The monomer droplets, which may be microencapsulated if desired, may, if desired, contain an initiator or mixtures of initiators to initiate the polymerization. Examples of initiators suitable for the novel process are peroxy compounds, such as dibenzoyl peroxide, dilauroyl peroxide, bis(p-chlorobenzoyl)peroxide, dicyclohexyl peroxydicarbonate, tert-butyl peroctoate, tert-butyl peroxy-2-ethylhexanoate, 2,5-bis(2-ethylhexanoyl-peroxy)-2,5-dimethylhexane, and tert-amylperoxy-2-ethylhexane, and azo compounds, such as 2,2'-azobis(isobutyronitrile) and 2,2'-azobis(2-methylisobutyronitrile).

The amounts used of the initiators are generally from 0.05 to 2.5% by weight (preferably from 0.1 to 1.5% by weight), based on the mixture of monomers.

To create a macroporous structure in the spherical polymer it is possible, if desired, to use porogens as other additives in the optionally microencapsulated monomer droplets. Suitable compounds for this purpose are organic solvents which are poor solvents and, respectively, swelling agents with respect to the polymer produced. Examples that may be mentioned are hexane, octane, isooctane, isododecane, methyl ethyl ketone, butanol, and octanol and isomers thereof.

The concepts "microporous" or "gel" and "macroporous" have been described in detail in the technical literature.

Substances that are monodisperse for the purposes of the present application are those for which the diameter of at least 90% by volume or by weight of the particles varies from the most frequent diameter by not more than 10% of the most frequent diameter.

For example, in the case of a substance with a most frequent diameter of 0.5 mm, at least 90% by volume or by weight have a size range from 0.45 to 0.55 mm, and in the case of a substance with a most frequent diameter of 0.7 mm, at least 90% by weight or by volume have a size range from 0.77 mm to 0.63 mm.

Bead polymers preferred for the purposes of the present invention and prepared in process step (a) have a macroporous structure.

Monodisperse macroporous bead polymers may be produced, for example, by adding inert materials (porogens) to the monomer mixture during the polymerization. Suitable substances of this type are primarily organic substances that dissolve in the monomer but are poor solvents and, respectively, swelling agents for the polymer (precipitants for polymers), for example, aliphatic hydrocarbons (Farbenfabriken Bayer DBP 1045102, 1957; DBP 1113570, 1957).

U.S. Pat. No. 4,382,124, for example, uses alcohols having from 4 to 10 carbon atoms as porogen for preparing monodisperse, macroporous bead polymers based on styrene/divinylbenzene. An overview of preparation methods for macroporous bead polymers is also given.

The monomer droplets, which may be microencapsulated if desired, may also, if desired, comprise up to 30% by weight (based on the monomer) of crosslinked or non-crosslinked polymer. Preferred polymers derive from the above-mentioned monomers, particularly preferably from styrene.

The average particle size of the monomer droplets, which may be encapsulated if desired, is from 10 to 1000 µm, preferably from 100 to 1000 µm. The novel process is also very suitable for preparing monodisperse spherical polymers.

When monodisperse bead polymers are prepared according to process step (a) the aqueous phase may, if desired, comprise a dissolved polymerization inhibitor. Both inorganic and organic substances are possible inhibitors for the purposes of the present invention. Examples of inorganic inhibitors are nitrogen compounds, such as hydroxylamine, hydrazine, sodium nitrite, and potassium nitrite, salts of phosphorous acid, such as sodium hydrogen phosphite, and sulfur-containing compounds, such as sodium dithionite, sodium thiosulfate, sodium sulfite, sodium bisulfite, sodium thiocyanate, and ammonium thiocyanate. Examples of organic inhibitors are phenolic compounds, such as hydroquinone, hydroquinone monomethyl ether, resorcinol, pyrocatechol, tert-butyl-pyrocatechol, pyrogallol, and condensation products made from phenols with aldehydes. Other suitable organic inhibitors are nitrogen-containing compounds, including hydroxylamine derivatives, such as N,N-diethyl-hydroxylamine, N-isopropylhydroxylamine, and sulfonated or carboxylated derivatives of N-alkylhydroxylamine or of N,N-dialkylhydroxylamine, hydrazine derivatives, such as N,N-hydrazinodiacetic acid, nitroso compounds, such as N-nitrosophenylhydroxylamine, the ammonium salt of N-nitrosophenylhydroxylamine, or the aluminum salt of N-nitrosophenyl-hydroxylamine. The concentration of the inhibitor is from 5 to 1000 ppm (based on the aqueous phase), preferably from 10 to 500 ppm, particularly preferably from 10 to 250 ppm.

As mentioned above, the polymerization of the optionally micro-encapsulated monomer droplets to give the spherical monodisperse bead polymer may, if desired, take place in the presence of one or more protective colloids in the aqueous phase. Suitable protective colloids are natural or synthetic water-soluble polymers, such as gelatin, starch, polyvinyl alcohol, polyvinylpyrrolidone, polyacrylic acid, polymethacrylic acid, or copolymers made from (meth)acrylic acid and from (meth)-acrylates. Other very suitable materials are cellulose derivatives, particularly cellulose esters and cellulose ethers, such as carboxymethylcellulose, methylhydroxyethylcellulose, methylhydroxypropylcellulose, and hydroxyethylcellulose. Gelatin is particularly suitable. The amount used of the protective colloids is generally from 0.05 to 1% by weight (preferably from 0.05 to 0.5% by weight), based on the aqueous phase.

The polymerization to give the spherical, monodisperse bead polymer in process step (a) may, if desired, also be carried out in the presence of a buffer system. Preference is given to buffer systems that set the pH of the aqueous phase at the beginning of the polymerization to between 14 and 6 (preferably between 12 and 8). Under these conditions protective colloids having carboxylic acid groups are present to some extent or entirely in the form of salts, which has a favorable effect on the action of the protective colloids. Particularly suitable buffer systems comprise phosphate salts or borate salts. For the purposes of the present invention, the terms phosphate and borate also include the condensation products of the ortho forms of corresponding acids and salts. The concentration of the phosphate or borate in the aqueous phase is from 0.5 to 500 mmol/l, preferably from 2.5 to 100 mmol/l.

The stirring speed during the polymerization is relatively non-critical and, unlike in conventional bead polymerization, has no effect on the particle size. The stirring speeds used are low speeds which are sufficient to keep the monomer droplets in suspension and to promote dissipation of the heat of polymerization. A variety of stirrer types can be used for this task. Gate stirrers with an axial action are particularly suitable.

The ratio by volume of encapsulated monomer droplets to aqueous phase is from 1:0.75 to 1:20, preferably from 1:1 to 1:6.

The polymerization temperature depends on the decomposition temperature of the initiator used and is generally from 50 to 180° C. (preferably from 55 to 130° C.). The polymerization takes from 0.5 hour to a few hours. It has proven successful to use a temperature program in which the polymerization is begun at a low temperature (for example, 60° C.) and the reaction temperature is raised as the polymerization conversion progresses. This is a very good way of fulfilling, for example, the requirement for a reaction that proceeds reliably and with a high polymerization conversion. After polymerization, the polymer is isolated using conventional methods (for example, by filtration or decanting) and washed if desired.

In process step (b) the amidomethylating reagent is first prepared. This is done, for example, by dissolving a phthalimide or a phthalimide derivative in a solvent and mixing with formalin. A bis(phthalimido)ether is then formed from this material with elimination of water. The bis(phthalimido) ether may, if desired, be reacted to give the phthalimido ester. For the purposes of the present invention, preferred phthalimide derivatives are phthalimide itself and substituted phthalimides such as methylphthalimide.

Solvents used in process step (b) are inert and suitable for swelling the polymer and are preferably chlorinated hydrocarbons, particularly preferably dichloroethane or methylene chloride.

In process step (b) the bead polymer is condensed with phthalimide derivatives. The catalyst used here comprises oleum, sulfuric acid, or sulfur trioxide.

Process step (b) is carried out at temperatures of from 20 to 120° C., preferably from 50 to 100° C., particularly preferably from 60 to 90° C.

The elimination of the phthalic acid residue, and with this the release of the aminomethyl group, takes place in process step (c) via treatment of the phthalimidomethylated crosslinked bead polymer with aqueous or alcoholic solutions of an alkali metal hydroxide, such as sodium hydroxide or potassium hydroxide, at temperatures of from 100 to 250° C. (preferably from 120 to 190° C.). The concentration of the aqueous sodium hydroxide is from 10 to 50% by weight, preferably from 20 to 40% by weight. This process allows the preparation of crosslinked bead polymers containing aminoalkyl groups with substitution of the aromatic rings at a level greater than 1.

The resultant aminomethylated bead polymer is finally washed with deionized water until free of alkali.

In process step (d) the anion exchangers are prepared by reacting the aminomethylated monodisperse, crosslinked vinylaromatic base polymer in suspension with Leuckart-Wallach alkylating agents to give weakly basic anion exchangers having tertiary amino groups. Leuckart-Wallach reagents are described, by way of example, in *Organikum* [*Organic Chemistry*], VEB Deutscher Verlag der Wissenschaften, Berlin 1968, 8$^{th}$ Edition, page 479.

Water is used as suspension medium.

Process step (d) is carried out at temperatures of from 20 to 150° C. (preferably from 40 to 110° C.) and at pressures of from atmospheric pressure to 6 bar (preferably at from atmospheric pressure to 4 bar).

There are various ways of undertaking the loading with strong acids according to process step (e) prior to quaternization:

1. by directly partially loading the weakly basic anion exchanger with the calculated amount of acid; or
2. by undertaking the partial loading in two stages by first fully loading the weakly basic anion exchanger with an excess of acid and in a second stage partially regenerating the fully loaded weakly basic anion exchanger by treatment with a calculated amount of aqueous base (from 0.7 to 0.15 equivalents of base per mole of amino groups in the weakly basic anion exchanger).

The quaternization of the weakly basic anion exchangers that are partially loaded according to procedure 1 gives bifunctional anion exchangers that have no isomerization action on glucose or have a significantly lower level of action than bifunctional anion exchangers having the same content of strongly basic groups prepared by known processes.

The quaternization of the weakly basic anion exchangers that are partially loaded in two stages according to procedure 2 gives bifunctional anion exchangers that, compared with bifunctional anion exchangers of the same degree of quaternization and prepared by known processes, have better decolorizing performance, are easier to regenerate, and have a still lower tendency toward contamination by organic substances.

It has been found that partial preloading of the weakly basic anion exchange resins using strong acids gives a certain arrangement of the strongly and weakly basic groups within the resin particle and that this certain arrangement of the strongly basic groups within the resin particle is the source of the new and improved properties of the bifunctional, monodisperse anion exchangers having strongly basic functional groups and obtainable according to the invention.

The quaternization of the weakly basic anion exchangers partially loaded according to procedure 1 gives bifunctional anion exchangers which contain strongly basic groups in the center of the resin particle; when the weakly basic anion exchangers partially loaded according to procedure 2 are quaternized, the strongly basic groups are in the shell of the resin particle. Quaternization of the weakly basic anion exchangers without acid pretreatment gives bifunctional anion exchangers in which the strongly basic groups have a random distribution across the entire cross section of the particle.

In order to achieve the best possible uniformity of partial loading of the resin particles, the partial loading of the weakly basic anion exchangers using acids according to procedure 1 is preferably undertaken by suspending the weakly basic anion exchanger in the calculated amount of aqueous acid and intensively stirring the suspension at temperatures of from 5 to 40° C., preferably at room temperature, until the pH of the aqueous solution shows no further change. However, the partial loading of the weakly basic anion exchanger using acid may also be undertaken by suspending the exchanger in deionized water and mixing the suspension with the calculated amount of acid, with intensive stirring at temperatures of from 5 to 40° C., and then again stirring to constant pH. The partial quaternization to give the bifunctional anion exchanger may be undertaken directly by adding the alkylating agent to the suspension.

In the partial loading of the weakly basic anion exchangers according to procedure 2 the first substage (i.e., the full loading of the weakly basic anion exchanger using acids) may take place either by suspending the weakly basic anion exchanger in the acid and stirring the suspension to constant pH of the aqueous solution (batch process) or by passing the acid over the anion exchanger in a filter column (column process). After the full loading the excess of acid is removed by washing with deionized water. The second substage (i.e., the partial regeneration) is preferably undertaken by a batch process in order to achieve the greatest possible uniformity of partial regeneration of all of the resin particles. That is, the weakly basic anion exchanger in salt form is suspended in deionized water and the suspension mixed with the calculated amount of base, with intensive stirring at temperatures of from 5 to 40° C., and then stirred to constant pH of the aqueous solution.

Acids suitable for use for the loading of the weakly basic anion exchangers are strong inorganic acids, such as hydrochloric acid, nitric acid, sulfuric acid, or phosphoric acid, and strong organic acids, such as formic acid or p-toluenesulfonic acid. The inorganic acids are preferred for cost reasons.

The concentration of the acids in the aqueous solutions used for the loading is preferably from 0.1 to 20% by weight, in particular from 5 to 10% by weight.

The bases used as aqueous solutions for the partial regeneration of the fully loaded weakly basic anion exchangers may be either inorganic or organic. Preference is given to the use of aqueous solutions of sodium hydroxide, potassium hydroxide, sodium carbonate, or ammonia. The concentration of the bases in the aqueous solutions is preferably from 5 to 10% by weight.

The weakly basic anion-exchange resins to be used in the novel process for preparing the bifunctional anion exchangers are known, as is their preparation. See, for example, *Ullmanns Enzyklopädie der technischen Chemie* [*Ullmann's Encyclopaedia of Industrial Chemistry*], 4$^{th}$ Edition, Vol. 13, pages 301 to 303. It is possible to use weakly basic anion-exchange resins based on crosslinked polyacrylates or on crosslinked polystyrenes. The anion exchangers may be gels or macroporous. Bifunctional anion exchangers with particularly advantageous properties are obtained starting from resins made from crosslinked polystyrene.

Following the partial loading according to the invention of the weakly basic anion exchangers using strong acids, the anion exchangers, partially in salt form, are quaternized in a conventional manner. See *Ullmanns Enzyklopädie* [*Ullmann's Encyclopaedia*], cited above. The degree of quaternization depends on the application for which the particular anion exchanger is intended. For deionizing sugar solutions, it is preferable to use bifunctional anion exchangers based on crosslinked polystyrene and having a content of from 5 to 25% of strongly basic groups, based on all of the basic groups present in the anion exchanger. For decolorizing sugar solutions it is preferable to use bifunctional anion exchangers quaternized using hydrophobic radicals (e.g., benzyl radicals) and based on crosslinked polyacrylate, and having a content of strongly basic groups of from 20 to 75% (preferably from 40 to 80%), based on all of the basic groups present in the anion exchanger.

The present invention also provides the monodisperse anion exchangers prepared according to the novel process and having strongly basic functional groups distributed either in the center of the resin particle or in the shell of the resin particle.

The novel process preferably gives monodisperse anion exchangers having the functional groups

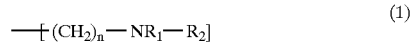

(1)

or

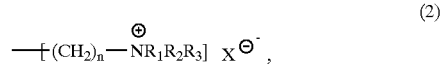

(2)

wherein

R$_1$ is an alkyl group, a hydroxyalkyl group, or an alkoxyalkyl group,

R$_2$ is an alkyl group, an alkoxyalkyl group, or a hydroxyalkyl group,

R$_3$ is an alkyl group, an alkoxyalkyl group, or a hydroxyalkyl group, n is an integer from 1 to 5 (particularly preferably 1), and X is an anionic counterion (preferably Br$^-$, Cl$^-$, SO$_4^{2-}$, NO$_3^-$ or OH$^-$), where group (2) is either very particularly preferably in the center of the resin particle or very particularly preferably in the shell of the resin particle.

In the radicals R$_1$, R$_2$, and R$_3$ it is preferable for each alkoxy and alkyl to contain from 1 to 6 carbon atoms.

Each aromatic ring in the novel monodisperse anion exchangers preferably has from 0.1 to 2 of the above-mentioned functional groups (1) or (2).

The anion exchangers prepared according to the invention are used to remove anions from aqueous or organic solutions or their vapors, to remove anions from condensates to remove color particles from aqueous or organic solutions or their vapors, to decolorize and deionize wheys, aqueous gelatin solutions, fruit-juices, fruit-musts, and aqueous solutions of sugars (preferably mono- and disaccharides, especially preferably aqueous solutions of glucose, fructose, aqueous solutions of sugar from sugar canes or sugar beets) in the sugar industry, starch industry, pharmaceutical industry, or dairy farms, and to remove organic components from aqueous solutions, for example, humic acids from surface water.

The novel anion exchangers may also be used for purifying and treating water in the chemical industry or electronics industry, in particular for preparing ultra-high-purity water.

The novel anion exchangers may also be used in combination with gel-type and/or macroporous cation exchangers for deionizing aqueous solutions and/or condensates, in particular in the sugar industry.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Example 1

1a) Preparation of the Monodisperse Macroporous Bead Polymer Based on Styrene, Divinylbenzene, and Ethylstyrene 3000 g of deionized water were placed in a 10 liter glass reactor, and a solution made from 10 g of gelatin, 16 g of disodium hydrogen phosphate dodecahydrate, and 0.73 g of resorcinol in 320 g of deionized water was added and thoroughly mixed. The temperature of the mixture was controlled to 25° C. Then, with stirring, a mixture made from 3200 g of microencapsulated monomer droplets with a narrow particle size distribution and made from 3.6% by weight of divinylbenzene and 0.9% by weight of ethylstyrene (used in the form of a commercially available isomer mixture of divinylbenzene and ethylstyrene in 80% of divinylbenzene), 0.5% by weight of dibenzoyl peroxide, 56.2% by weight of styrene, and 38.8% by weight of isododecane (industrial isomer mixture with a high proportion of pentamethylheptane), wherein the microcapsules were composed of a formaldehyde-hardened complex coacervate made from gelatin and from a copolymer of acrylamide and acrylic acid, was introduced and 3200 g of aqueous phase with a pH of 12 was added. The average particle size of the monomer droplets was 460 μm.

The mix was polymerized to completion, with stirring, by increasing the temperature according to a temperature program starting at 25° C. and finishing at 95° C. The mix was cooled, washed using a 32 μm screen, and then dried in vacuo at 80° C. This gave 1893 g of a spherical polymer with an average particle size of 440 μm, narrow particle size distribution, and a smooth surface.

The polymer had a white appearance from above and had a bulk density of about 370 g/l.

1b) Preparation of the Amidomethylated Bead Polymer 2400 g of dichloroethane, 595 g of phthalimide, and 413 g of 30% strength by weight formalin were placed in a vessel at room temperature. The pH of the suspension was adjusted to from 5.5 to 6 using aqueous sodium hydroxide. The water was then removed by distillation. 43.6 g of sulfuric acid were then metered in and the resultant water was removed by distillation. The mix was cooled. 174.4 g of 65% strength oleum were metered in at 30° C., followed by 300 g of monodisperse bead polymer prepared according to process step a). The suspension was heated to 70° C. and stirred for a further 6 hours at this temperature. The reaction liquid was drawn off, deionized water was metered in, and residual dichloroethane was removed by distillation.

Yield of amidomethylated bead polymer: 1820 ml; Composition by elemental analysis: carbon: 75.3% by weight; hydrogen: 4.6% by weight; nitrogen: 5.75% by weight.

1c) Preparation of the Aminomethylated Bead Polymer 851 g of 50% strength by weight aqueous sodium hydroxide and 1470 ml of deionized water were metered at room temperature into 1770 ml of amidomethylated bead polymer from Example 1b). The suspension was heated to 180° C. and stirred for 8 hours at this temperature.

The resultant bead polymer was washed with deionized water.

Yield of aminomethylated bead polymer: 1530 ml; The overall yield (extrapolated) was 1573 ml. Composition by elemental analysis: carbon: 78.2% by weight; nitrogen: 12.25% by weight; hydrogen: 8.4% by weight. Amount of aminomethyl groups in mol per liter of aminomethylated bead polymer: 2.13; Amount of aminomethyl groups in mol in the total yield of aminomethylated bead polymer: 3.259; On statistical average each aromatic ring—stemming from the styrene units and divinylbenzene units—had 1.3 hydrogen atoms substituted by aminomethyl groups.

1d) Preparation of a Monodisperse, Weakly Basic Anion Exchanger Having Dimethylaminomethyl Groups 1995 ml of deionized water and 627 g of 29.8% strength by weight formalin solution were metered at room temperature into 1330 ml of aminomethylated bead polymer from Example 1c). The mix was heated to 40° C. This was followed by heating to 97° C. over a period of 2 hours. During this time, a total of 337 g of 85% strength by weight formic acid were metered into the mix. The pH was then adjusted to pH 1 within a period of 1 hour using 50% strength by weight sulfuric acid. Stirring continued for 10 hours at pH 1. After cooling, the resin was washed with deionized water and, using aqueous sodium hydroxide, freed from sulfate and converted into the OH form.

Yield of resin having dimethylamino groups: 1440ml; The overall yield (extrapolated) was 1703 ml. The product contained 2.00 mol of dimethylamino groups per liter of resin. The total amount of dimethylamino groups in mol in the total yield of product having dimethylamino groups was 3.406.

1e) Strongly Basic Functional Groups in the Center of the Resin Particle 1000 ml of the weakly basic anion exchanger described in Example 1d) and having dimethylaminomethyl groups, in the free base form, were uspended in 1300 ml of deionized water in a reactor equipped with ressure-retention valve, gas inlet pipe, stirrer, and thermometer. 1.58 liters of 3% strength by weight hydrochloric acid were metered into the mixture over a period of 10 minutes. The suspension was mixed by stirring until the pH of the aqueous solution showed no further change (about 30 minutes). Then, within a period of 30 minutes and at 40° C., 25.25 g of methyl chloride (0.5 mol) were metered in. To complete the reaction the suspension was stirred at this temperature for 7 hours.

After cooling, the liquid phase was removed and the bead polymer was washed with deionized water in a filter column.

Yield: 1625 ml; Content of strongly basic groups: 0.540 mol, corresponding to 0.332 mol per liter of anion exchanger; Content of weakly basic groups: 2.213 mol, corresponding to 1.362 mol per liter of anion exchanger.

Example 2

Steps 2a) to 2d) are carried out according to Example 1

2e) Strongly Basic Functional Groups in the Shell of the Resin Particle 1000 ml of the weakly basic anion exchanger described in Example 1d) and having dimethylaminomethyl groups, in the free base form, were converted into the chloride form in a filter column by passing 2 liters of 8% strength by weight aqueous hydrochloric acid through the column. The excess acid was removed by washing the anion exchanger with deionized water (pH of the run-off water 4–5). The 1520 ml of anion exchanger thus obtained in the salt form were suspended in 1900 ml of deionized water in a reactor equipped with pressure-retention valve, gas inlet pipe, stirrer, and thermometer. Then, with stirring, 400 ml of 8% strength by weight aqueous sodium hydroxide were metered in and stirred to constant pH of the aqueous solution (from 8 to about 30 minutes). Then, within a period of 30 minutes and at 40° C., 25.25 g of methyl chloride (0.5 mol) were metered in. To complete the reaction, the suspension was stirred at this temperature for 7 hours.

After cooling, the liquid phase was removed and the bead polymer was washed with deionized water in a filter column.

pYield: 1605 ml; Content of strongly basic groups: 0.496 mol, corresponding to 0.309 mol per liter of anion exchanger; Content of weakly basic groups: 1.989 mol, corresponding to 1.239 mol per liter of anion exchanger.

Test Methods

Determination of the amount of weakly basic and strongly basic groups in anion exchangers.

100 ml of anion exchanger were treated with 1000 ml of 2% strength by weight aqueous sodium hydroxide over a period of 1 hour and 40 minutes in a glass column. The resin was then washed with deionized water to remove excess sodium hydroxide.

Determination of the NaCl Number 50 ml of the exchanger in the free base form and washed so as to be neutral were placed in a column and treated with 950 ml of 2.5% strength by weight aqueous sodium chloride solution. The run-off was collected and made up to 1 liter using deionized water, and 50 ml of this solution were titrated with 0.1 N hydrochloric acid. The resin was washed with deionized water.

Volume of 0.1 N hydrochloric acid used in ml×4/100= NaCl number in mol/liter of resin.

Determination of the NaNO3 Number 950 ml of 2.5% strength by weight sodium nitrate solution were then passed through the column used for the NaCl number determination. The run-off was made up to 1000 ml using deionized water. An aliquot (10 ml of this solution) was removed and analyzed for chloride content by titration with mercury nitrate solution.

Volume of $Hg(NO_3)$ solution used in ml×factor/17.75= $NaNO_3$ number in mol/liter of resin.

Determination of the HCl Number

The same resin was washed with deionized water and washed out into a glass beaker. It was mixed with 100 ml of 1 N hydrochloric acid and allowed to stand for 30 minutes. The entire suspension was washed out into a glass column. A further 100 ml of hydrochloric acid were passed through the column over the resin. The resin was washed with methanol. The run-off was made up to 1000 ml using deionized water. 50 ml of this solution were titrated with 1 N aqueous sodium hydroxide.

(20—volume of 1 N aqueous sodium hydroxide used in ml)/5=HCl number in mol/liter of resin.

The amount of strongly basic groups is given by the sum of the $NaNO_3$ number and the HCl number.

The amount of weakly basic groups is given by the HCl number.

Number of Perfect Beads After Preparation 100 beads were inspected under a microscope. The number of beads that were cracked or splintered was counted. The number of perfect beads is given by the difference between the number of damaged beads and 100.

Determination of the Stability of the Resin by the Roll Test

The bead polymer to be tested was distributed at a uniform layer thickness between two cloths made of synthetic material. The cloths were laid on a firm horizontal substrate and subjected to 20 operating cycles in a roll apparatus. An operating cycle was composed of one pass and return pass of the roll. After rolling, representative samples of 100 beads were taken and the number of undamaged beads counted under a microscope.

Swelling Stability Test 25 ml of anion exchanger in the chloride form were placed in a column. 4% strength by weight aqueous sodium hydroxide, deionized water, 6% strength by weight hydrochloric acid, and, again, deionized water were fed to the column in succession. The aqueous sodium hydroxide and the hydrochloric acid flowed downward through the resin, while the deionized water was pumped upward through the resin. A control device controlled the treatment in time cycles. One operating cycle lasted 1 hour. 20 operating cycles were carried out. Once the operating cycles had ended, 100 beads were counted out from the resin sample. The number of perfect beads, not damaged by cracking or splintering, was counted.

Utilizable Capacity of Strongly Basic and Moderately Basic Anion Exchangers 1000 ml of anion exchanger in the chloride form (i.e., with chloride as the counterion for the nitrogen atom) were placed in a glass column. 2500 ml of 4% by weight aqueous sodium hydroxide were passed through the column over the resin in 1 hour. This was followed by washing with 2 liters of debasified (i.e., decationized) water. Water with a total anion hardness of 25° German hardness was then passed through the column over the resin at a rate of 10 liters per hour. The eluent was analyzed for hardness and also for residual silicic acid. The loading ended at a residual silicic acid content of >0.1 mg/l.

The amount of water which passed through the column over the resin, the total anion hardness of the water passed through the column, and the amount of resin incorporated were used to determine how many grams of CaO are absorbed per liter of resin. The amount of CaO in grams gives the utilizable capacity of the resin in terms of the unit: grams of CaO per liter of anion exchanger.

Volume Difference Chloride/OH Form

Deionized water was used to wash 100 ml of anion exchanger having basic groups into a glass column. 1000 ml of 3% strength by weight hydrochloric acid were passed through the column in 1 hour and 40 minutes. The resin was then washed with deionized water until free of chloride. The resin was washed into a tamp volumeter under deionized water and agitated to constant volume—volume V 1 of the resin in the chloride form.

The resin was transferred back to the column. 1000 ml of 2% strength by weight aqueous sodium hydroxide were passed through the column. The resin was then washed with deionized water to remove alkali until the eluent had a pH of 8. The resin was washed out into a tamp volumeter under deionized water and agitated to constant volume—volume V2 of the resin in the free base form (OH form).

Calculation: V1−V2=V3 V3: V1/100=swelling difference chloride/OH form in %

Comparison of the monodisperse anion exchangers obtained according to Examples 1 and 2 with the heterodisperse anion exchangers known from EP-A 351,621 showed markedly higher utilizable capacity and at the same time, surprisingly, markedly higher swelling stability, together with improved stability of the resin in the roll test.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing monodisperse anion exchangers having strongly basic functional groups distributed either in the center of the resin particle or in the shell of the resin particle comprising (a) reacting monomer droplets made from at least one monovinylaromatic compound and at least one polyvinylaromatic compound to give a monodisperse, crosslinked bead polymer, (b) amidomethylating the monodisperse, crosslinked bead polymer from step (a) with a phthalimide derivative, (c) converting the amidomethylated bead polymer from step (b) to an aminomethylated bead polymer, (d) Leuckart-Wallach-alkylating the aminomethylated bead polymer from step (c) to give a weakly basic anion exchanger having tertiary amino groups, (e) partially loading the weakly basic anion exchanger from step (d) using a strong acid, and (f) quaternizing the partially loaded weakly basic anion exchanger from step (e).

2. A process according to claim 1 wherein the monomer droplets are microencapsulated using a complex coacervate.

3. A process according to claim 1 wherein step (a) is carried out in the presence of a protective colloid.

4. A process according to claim 1 wherein step (a) is carried out in the presence of at least one initiator.

5. A process according to claim 1 wherein the monomer droplets comprise porogens that, after the polymerization, form macroporous, crosslinked bead polymers.

6. A process according to claim 1 wherein a polymerization inhibitor is used in step (a).

7. A process according to claim 3 wherein the protective colloids are gelatin, starch, polyvinyl alcohol, polyvinylpyrrolidone, polyacrylic acid, polymethacrylic acid, copolymers made from (meth)acrylic acid or (meth) acrylate, or mixtures thereof.

8. A process according to claim 1 wherein the monovinylaromatic compounds are monoethylenically unsaturated compounds.

9. A process according to claim 1 wherein the polyvinylaromatic compounds are divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate, allyl methacrylate, or mixtures thereof.

10. A process according to claim 1 wherein the initiator is a peroxy compound or an azo compound.

11. A process according to claim 10 wherein the initiator is dibenzoyl peroxide, dilauroyl peroxide, bis-(p-chlorobenzoyl)peroxide, dicyclohexyl peroxydicarbonate, tert-butyl peroctoate, tert-butyl peroxy-2ethyl-hexanoate, 2,5-bis-(2-ethylhexanoylperoxy)-2,5-dimethylhexane, or tert-amylperoxy-2-ethylhexane.

12. A process according to claim 10 wherein the initiator is 2,2'-azobis(isobutyronitrile) or 2,2'-azobis-(2-methylisobutyronitrile).

13. A process according to claim 1 wherein a phthalimido ether is formed in step (b).

14. A process according to claim 13 wherein the phthalimido ether is prepared from phthalimide or from a derivative thereof and formalin.

15. A process according to claim 13 wherein the reaction of the phthalimido ether with the bead polymer takes place in the presence of oleum, sulfuric acid, or sulfur trioxide.

16. A process according to claim 1 wherein in step (e) the weakly basic anion exchanger is directly partially loaded with the calculated amount of acid.

17. A process according to claim 1 wherein step (e) is carried out in two stages wherein in a first stage the weakly basic anion exchanger is fully loaded with an excess of acid and in a second stage the fully loaded weakly basic anion exchanger is partially regenerating with a calculated amount of aqueous base.

* * * * *